Aug. 2, 1949.  E. D. GAGE  2,477,592
COUPLING FOR OVERHEAD IRRIGATION PIPES
Filed April 7, 1947
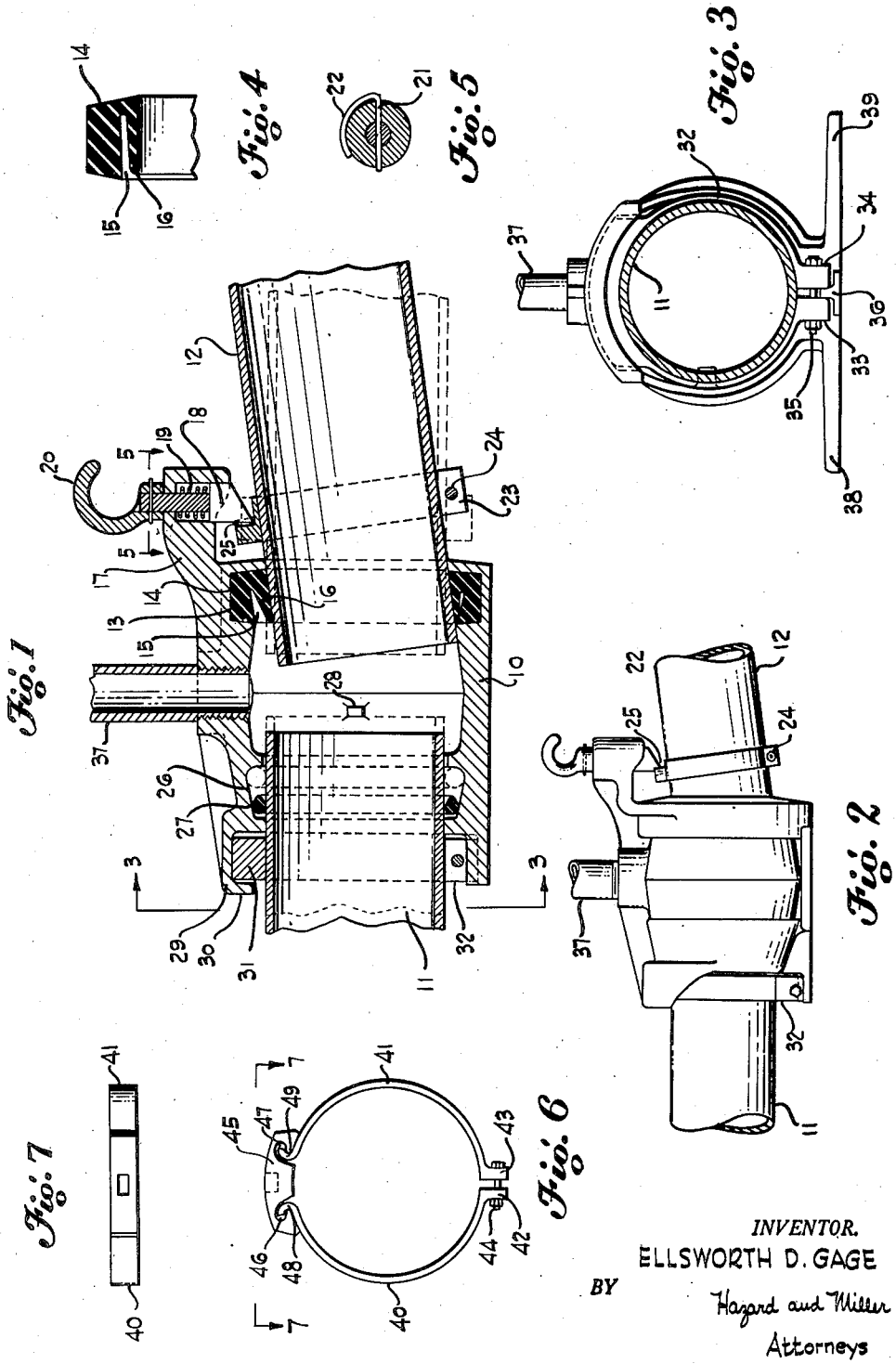
INVENTOR.
ELLSWORTH D. GAGE
BY Hazard and Miller
Attorneys Patented Aug. 2, 1949

2,477,592

UNITED STATES PATENT OFFICE 2,477,592

COUPLING FOR OVERHEAD IRRIGATION PIPES

Ellsworth D. Gage, Arcadia, Calif.

Application April 7, 1947, Serial No. 739,838

6 Claims. (Cl. 285—168)

1

This invention relates to a coupling for overhead irrigation pipes and the like and may be regarded as an improvement over the coupling disclosed in my prior Patent No. 2,049,801, issued August 4, 1936.

In the above-mentioned patent there is disclosed a coupling for the adjacent ends of sections of irrigation pipe wherein the ends of the pipe sections may be thrust into the coupling through a flexible sealing or packing ring therein and wherein the sections of pipe have collars welded onto their exteriors that are adapted to be engaged by spring actuated latches on the coupling to retain the pipe ends within the coupling. The arrangement is such as to permit some lateral movement of each pipe end with relation to the coupling.

Pipe used for overhead irrigation is usually formed of a heat treated metal and if the collars are welded to the exterior of the pipe this involves subjecting the pipe to a second or further heat treatment after the welding is completed. It is desirable to avoid the welding of the collars onto the pipe in that regular or straight run pipe which has been properly heat treated in the course of its manufacture can be utilized without destroying or affecting the heat treatment by the welding operation.

It is, therefore, an object of the present invention to provide an improved coupling for overhead irrigation pipes and the like wherein the coupling is so designed that one end of one pipe section may be merely thrust into the coupling in such a manner as to effect a very tight leak-proof seal therewith. The end of the adjoining pipe section may be inserted into the coupling and retained therein by a spring-actuated latch engaging an external collar which is not welded to the pipe, thus enabling straight run pipe or pipe as normally produced to be utilized. At the same time ample flexibility of the connection is possible and quick attachment and detachment of adjacent pipe sections is obtained.

Another object of the invention is to provide a coupling applicable to one end of a pipe section which has a novel means for effecting a seal between the interior of the coupling and the exterior of the pipe end and which has a clamping device designed to be permanently associated with the body of the coupling and which can be clamped about the pipe end to retain the coupling thereon so that when the coupling is once applied to the pipe end it will be substantially permanently associated with that end of the pipe

2 and carried thereby in shifting the irrigation pipe from place to place.

With the foregoing and other objects in view, which will be made manifest in the following detailed description and specifically pointed out in the appended claims, reference is had to the accompanying drawings for an illustrative embodiment of the invention, wherein:

Figure 1 is a vertical section through the improved pipe coupling embodying the present invention;

Fig. 2 is a view in side elevation of the same;

Fig. 3 is a vertical section taken substantially upon the line 3—3 upon Fig. 1;

Fig. 4 is a partial view in vertical section illustrating a portion of one of the sealing rings employed;

Fig. 5 is a horizontal section taken substantially upon the line 5—5 upon Fig. 1;

Fig. 6 is a view in end elevation of a modified form of clamping ring; and

Fig. 7 is a top plan view of the ring illustrated in Fig. 6.

Referring to the accompanying drawings wherein similar reference characters designate similar parts throughout, the improved coupling consists of a coupling body generally indicated at 10 and open at each end so as to receive pipe ends 11 and 12 of two adjoining pipe sections. The interior of the body is somewhat enlarged so as to possess an internal diameter somewhat greater than the external diameter of the pipe sections and is such that the pipe section 12 may tilt or be swung laterally with respect to the body of the coupling as is indicated in full lines on Fig. 1. In one end of the coupling there is formed an internal annular groove 13 which receives a grooved packing ring 14, the groove 15 of which defines a relatively limp, flexible portion 16 designed to fit snugly about the exterior of pipe end 12. On the body 10 there is an arm 17 within which there is a spring-actuated latch 18 actuated by a spring 19 and urged in the direction of the pipe end 12. This latch may be retracted by means of a hook 20 which is applied to the stem of the latch and has a retainer 21 extending diametrically through the base of the hook and through the stem. The retainer has an integral arcuate portion 22 which extends around the side of the base of the hook across a diameter that is arranged at right angles to the portion 21 so as to be capable of retaining itself in applied position. The latch is engageable with a collar 23 which is in the form of a split ring that is slipped over the pipe end 12 and which is clamped thereon such as by a clamping bolt 24. At the top of this ring there is a recess 25 into which the latch 18 is partially receivable and which when the latch is disposed therein holds the pipe end 12 against rotation relatively to the body 10.

Except for the details of construction of the latch and hook and for the construction of the split ring 23, the above described construction of the improved coupling is quite similar to that disclosed in my prior patent above mentioned. In the opposite end of the coupling there is an internal annular groove 26 which has its outer wall tapered axially toward the end of the coupling. Within this groove there is positioned a rubber ring or O ring 27 that initially or normally is circular in cross section, as indicated by dotted lines on Fig. 1. Within the body of the coupling there is a boss 28 arranged so as to be encountered by pipe end 11 when the pipe end is inserted into the coupling so as to limit its inward movement. When the pipe end 11 is inserted into the coupling to a position so as to encounter this boss, as indicated by dotted lines on Fig. 1, the ring 27 will move to the inner or larger end of the groove 26. However, if the pipe end 11 is withdrawn slightly, the ring 27 will be carried thereby to the outer end or smaller end of the groove 26 and be thus compressed between the wall of the groove and the exterior of the pipe end. It is not essential that the ring 27 be carried outwardly in the groove 26 on slightly withdrawing the pipe end inasmuch as any pressure within the coupling 10 is effective to force the ring 27 to the outer end of the groove and thus compress itself between the wall of the groove and the pipe end and thus effect a seal.

On the end of the body 10 adjacent the top thereof there is an overhanging arcuate flange generally indicated at 29 which, on its under side, has a transversely extending recess 30. This recess is adapted to receive an upstanding boss 31 on a split ring 32. This split ring has ears 33 and 34 that are adapted to be tightened together by means of a clamping bolt 35 to draw or tighten the ring about the pipe end 11. The bottom of the body 10 has an outwardly extending portion 36 which is of inverted T shape in cross section and is so positioned with relation to the flange 29 and the size of the split ring 32 that it is necessary to spring the ends of the split ring apart to pass the ears 33 and 34 thereon after the boss 31 has been inserted in its recess 30. In this manner, although the split ring is separate from the body 10, once that it has been assembled therewith by inserting the boss 31 into the recess 30 and springing the ring 32 to position its ears on the extension 36, the split ring is practically permanently assembled with the body 10.

When the pipe end 11 has been inserted in the body to engage the boss 28 and then is retracted for a short distance into the position shown in Fig. 1, the bolt 35 is tightened to clamp it about the pipe end and thus lock the pipe end against further withdrawal from the body. In the course of normal usage of the pipe section that provides the pipe end 11, the coupling remains attached to the end of this pipe section so that an irrigation pipe made up of sections in accordance with the present invention has one end of each section with the coupling body mounted thereon. The other end of each pipe section, one of which is illustrated at 12, is receivable in the other end of the coupling body as indicated in Fig. 1.

37 indicates an upstanding standpipe that may be screwed into the top of the coupling body, and 38 and 39 indicate laterally extending feet integral with the coupling body adapted to rest on the ground or any other suitable supporting surface to maintain the coupling body in a position wherein the standpipe 37 extends vertically.

As illustrated in Figs. 6 and 7, the split ring 32 need not be formed of one single or integral piece of metal. As illustrated in these figures, the split ring may be formed of two arcuate sections 40 and 41 equipped with ears 42 and 43 corresponding to the ears 33 and 34 and are adapted to be tightened together by means of a clamping bolt 44 about the pipe end 11. In this form of construction, however, the boss 31 is provided by a separate arcuate section of metal indicated at 45 so shaped and designed as to enter the recess 30. This section has recesses 46 and 47 on its under side adapted to receive respectively the returned or bent upper ends 48 and 49 on the sections 40 and 41. This form of construction may be advantageously used where the pipe sections, and consequently the coupling, are of relatively large diameter.

From the above described constructions it will be appreciated that an improved coupling is provided which enables the use of straight run conventional pipe which in the course of its manufacture may have been heat treated. Inasmuch as neither of the rings 23 or 32 are welded to the pipe the heat treatment of the pipe is not destroyed or modified and consequently it is not necessary to subject the pipe to a second heat treatment after welding. In addition, the improved construction is so designed as to enable the coupling to be permanently mounted on one end of a pipe section so as to be constantly associated therewith. The other end of an adjoining pipe section can be easily and quickly applied to the coupling or detached therefrom. Adequate angular adjustment is permissible between the coupling and that pipe end which is detachably connected thereto.

Various changes may be made in the details of construction without departing from the spirit and scope of the invention as defined by the appended claims.

I claim:

1. A pipe coupling comprising an open-ended body within the ends of which pipe ends are receivable, there being an axially tapered recess in one end of the body, a packing ring in said recess adapted to effect a seal between the exterior of the pipe end inserted therein and the interior of the body, and a split clamping ring disposed outwardly of the recess adapted to be clamped about the mentioned pipe end, the body providing an inwardly extending radial wall separating the packing ring from the clamping ring, said clamping ring having an external boss extending into a recess in the body locking the ring against axial movement relative to the body.

2. A pipe coupling comprising an open-ended body within the ends of which pipe ends are receivable, there being an axially tapered recess in one end of the body, a packing ring in said recess adapted to effect a seal between the exterior of the pipe end inserted therein and the interior of the body, and a split clamping ring disposed outwardly of the recess adapted to be clamped about the mentioned pipe end, the body providing an inwardly extending radial wall separating the packing ring from the clamping ring, said clamping ring having an external boss extending into a recess in the body locking the ring against axial movement relative to the body, the other end of the body having a gasket adapted to form a seal against the exterior of a pipe end inserted therein, and latch means on the body engageable with a shoulder on the mentioned pipe end.

3. A pipe coupling comprising an open-ended body within the ends of which pipe ends are receivable, there being an annular recess adjacent one end of the body, the walls of the body bounding the recess comprising an outer end wall, an inner end wall and an inner peripheral wall, the inner peripheral wall tapering axially toward the central axis of the body in a direction away from the body so that the depth of the recess increases toward the center of the body, a packing ring within the recess having a radial thickness less than the radial height of the outer end wall measured from the bottom of the recess, the packing ring having an axial thickness less than the distance between the end walls bounding the recess so that the ring will always be spaced from at least one of the end walls, the packing ring being adapted to be moved toward the inner end wall when a pipe end is inserted therethrough and then moved toward the outer end wall when the pipe end is partially withdrawn from the body to be squeezed between the inner peripheral wall and the pipe end to form a seal, the body providing an overhanging lip portion outwardly of the outer end wall, and a split clamping ring disposed outwardly of the outer end wall adapted to be clamped about the mentioned pipe end, said clamping ring having an external boss disposed behind the lip to prevent axial movement of the clamping ring.

4. A pipe coupling comprising an open-ended body within the ends of which pipe ends are receivable, means for forming a seal between the interior of the body and a pipe end inserted in one end thereof, and a split clamping ring disposed at the outer end of the mentioned end of the body adapted to be clamped about the mentioned pipe end, said ring having an external boss extending radially therefrom, the body providing an overhanging lip under which the boss is disposed to prevent axial movement of the clamping ring.

5. A pipe coupling comprising an open-ended body within the ends of which pipe ends are receivable, there being an annular recess adjacent one end of the body, the walls of the body bounding the recess comprising an outer end wall, an inner end wall and an inner peripheral wall, the inner peripheral wall tapering axially toward the central axis of the body in a direction away from the body so that the depth of the recess increases toward the center of the body, a packing ring within the recess having a radial thickness less than the radial height of the outer end wall measured from the bottom of the recess, the packing ring having an axial thickness less than the distance between the end walls bounding the recess so that the ring will always be spaced from at least one of the end walls, the packing ring being adapted to be moved toward the inner end wall when a pipe end is inserted therethrough and then moved toward the outer end wall when the pipe end is partially withdrawn from the body to be squeezed between the inner peripheral wall and the pipe end to form a seal, and a clamping ring disposed outwardly of the outer end wall adapted to be clamped about the mentioned pipe end, the body providing a stop outwardly of the clamping ring to prevent axial movement of the clamping ring.

6. A pipe coupling comprising an open-ended body within the ends of which pipe ends are receivable, there being an annular recess adjacent one end of the body, the walls of the body bounding the recess comprising an outer end wall, an inner end wall and an inner peripheral wall, the inner peripheral wall tapering axially towards the central axis of the body in a direction away from the body so that the depth of the recess increases towards the center of the body, a packing ring within the recess having an axial thickness less than the distance between the end walls bounding the recess so that the ring will always be spaced from at least one of the end walls, the packing ring being adapted to be moved towards the inner end wall when a pipe end is inserted therethrough and then moved towards the outer end wall when the pipe end is partially withdrawn from the body to be squeezed between the inner peripheral wall and the pipe end to form a seal, and a split clamping ring disposed outwardly of the outer end wall adapted to be clamped about the mentioned pipe end, the body providing a stop outwardly of the clamping ring to prevent axial movement of the clamping ring.

ELLSWORTH D. GAGE.

REFERENCES CITED

The following references are of record in the file of this patent:

UNITED STATES PATENTS

| Number | Name | Date |
|---|---|---|
| 2,049,801 | Gage | Aug. 4, 1936 |
| 2,256,845 | Lanninger | Sept. 23, 1941 |

FOREIGN PATENTS

| Number | Country | Date |
|---|---|---|
| 534,863 | Germany | Oct. 2, 1931 |